United States Patent
Chen et al.

(10) Patent No.: US 9,812,052 B2
(45) Date of Patent: Nov. 7, 2017

(54) 2D/3D IMAGE DISPLAYING APPARATUS

(71) Applicant: AU Optronics Corporation, Hsin-Chu (TW)

(72) Inventors: Chao-Yuan Chen, Hsin-Chu (TW); Wen-Hao Hsu, Hsin-Chu (TW); Ting-Jui Chang, Hsin-Chu (TW)

(73) Assignee: AU OPTRONICS CORPORATION, Hsin-Chu (TW)

( * ) Notice: Subject to any disclaimer, the term of this patent is extended or adjusted under 35 U.S.C. 154(b) by 428 days.

(21) Appl. No.: 14/549,787

(22) Filed: Nov. 21, 2014

(65) Prior Publication Data

US 2015/0077444 A1    Mar. 19, 2015

Related U.S. Application Data

(63) Continuation of application No. 12/575,819, filed on Oct. 8, 2009, now abandoned.

(30) Foreign Application Priority Data

Mar. 6, 2009   (TW) ................................ 98107430 A (51) Int. Cl.
*H04N 13/04*    (2006.01)
*G09G 3/20*    (2006.01)
(Continued)

(52) U.S. Cl.
CPC ........... *G09G 3/2003* (2013.01); *G09G 3/003* (2013.01); *G09G 3/20* (2013.01); *G09G 3/3677* (2013.01);
(Continued)

(58) Field of Classification Search
CPC .. G09G 3/2003; G09G 3/3688; G09G 3/3677; G09G 3/003; G09G 3/20;
(Continued)

(56) References Cited

U.S. PATENT DOCUMENTS 5,640,171 A   6/1997 Shimada
6,329,963 B1  12/2001 Chiabrera et al.
(Continued)

FOREIGN PATENT DOCUMENTS

CN    1721961    1/2006
CN    1936682    3/2007
CN    101345038  10/2009

OTHER PUBLICATIONS

English language translation of abstract of CN 101345038 (published Jan. 14, 2009).
(Continued)

*Primary Examiner* — Jared Walker
(74) *Attorney, Agent, or Firm* — McClure, Qualey & Rodack, LLP (57) ABSTRACT

A 2D/3D image displaying apparatus includes a sub-pixel, a first and second data lines and a gamma circuit. The sub-pixel includes a first portion and a second portion. The first and second data lines are coupled to the first and second portion of the sub-pixel, respectively. The gamma circuit transmits correlated gamma signals to a driving circuit for driving the first and second part of the sub-pixel via the first and second data lines when 2D image is to be displayed, and transmits a single gamma signal to the driving circuit for driving the first and second portion of the sub-pixel via the first and second data lines when 3D image is to be displayed.

20 Claims, 6 Drawing Sheets

(51) Int. Cl.
  *G09G 3/00* (2006.01)
  *G09G 3/36* (2006.01)

(52) U.S. Cl.
  CPC ....... *G09G 3/3688* (2013.01); *H04N 13/0452* (2013.01); *H04N 13/0454* (2013.01); *G09G 2300/0447* (2013.01); *G09G 2310/0278* (2013.01); *G09G 2320/0242* (2013.01); *G09G 2320/0673* (2013.01); *H04N 13/0497* (2013.01)

(58) Field of Classification Search
  CPC ... G09G 2310/0278; G09G 2320/0673; G09G 2320/0242; G09G 2300/0447; H04N 13/0454; H04N 13/0452; H04N 13/0497
  USPC .......................................................... 348/51
  See application file for complete search history.

(56) References Cited

U.S. PATENT DOCUMENTS

| | | | |
|---|---|---|---|
| 6,518,965 B2 | 2/2003 | Dye et al. | |
| 6,573,928 B1 | 6/2003 | Jones et al. | |
| 7,436,594 B2 | 10/2008 | Van Berkel et al. | |
| 7,511,877 B2 | 3/2009 | Kim et al. | |
| 7,522,184 B2 * | 4/2009 | Sun | G09G 3/3611 348/51 |
| 7,580,085 B2 | 8/2009 | Jacobs et al. | |
| 7,697,203 B2 | 4/2010 | Cha et al. | |
| 7,782,346 B2 | 8/2010 | Akiyama | |
| 7,839,378 B2 | 11/2010 | Krijn et al. | |
| 7,876,350 B2 | 1/2011 | Shin et al. | |
| 8,029,139 B2 | 10/2011 | Ellinger et al. | |
| 8,035,762 B2 | 10/2011 | Ijzerman et al. | |
| 8,040,307 B2 | 10/2011 | Kim et al. | |
| 8,077,117 B2 | 12/2011 | Kim et al. | |
| 8,164,598 B2 | 4/2012 | Kimpe | |
| 8,179,503 B2 | 5/2012 | Chen | |
| 2004/0080938 A1 | 4/2004 | Holman et al. | |
| 2004/0240777 A1 | 12/2004 | Woodgate et al. | |
| 2005/0276502 A1 | 12/2005 | Brown et al. | |
| 2006/0012593 A1 | 1/2006 | Iriguchi et al. | |
| 2006/0056791 A1 | 3/2006 | Tzschoppe | |
| 2006/0170644 A1 | 8/2006 | Ioki et al. | |
| 2007/0035830 A1 | 2/2007 | Matveev et al. | |
| 2007/0070008 A1 | 3/2007 | Shin et al. | |
| 2007/0091638 A1 | 4/2007 | Ijzerman et al. | |
| 2007/0242068 A1 | 10/2007 | Han et al. | |
| 2008/0204873 A1 | 8/2008 | Daniell | |
| 2008/0252578 A1 | 10/2008 | Kim et al. | |
| 2009/0051685 A1 | 2/2009 | Takagi et al. | |
| 2009/0190095 A1 * | 7/2009 | Ellinger | G02B 27/2207 353/7 |
| 2009/0244387 A1 * | 10/2009 | Lee | G09G 3/3233 348/674 |
| 2009/0278936 A1 | 11/2009 | Pastoor et al. | |
| 2010/0039503 A1 | 2/2010 | Lin et al. | |
| 2010/0097449 A1 | 4/2010 | Jeong et al. | |
| 2010/0238276 A1 | 9/2010 | Takagi et al. | |
| 2010/0265230 A1 | 10/2010 | Kang | |

OTHER PUBLICATIONS

English language translation of abstract of CN 1721961 (published Jan. 18, 2006).

English language translation of abstract of CN 1936682 (published Mar. 28, 2007).

* cited by examiner

2D/3D IMAGE DISPLAYING APPARATUS

RELATED APPLICATIONS

The present application is a Continuation Application of U.S. application Ser. No. 12/575,819, filed on Oct. 8, 2009, which was based on, and claims priority from, Taiwan Patent Application Serial Number 98107430, filed Mar. 6, 2009 the disclosure of which are hereby incorporated by reference herein in its entirely.

BACKGROUND

Field of Invention

The present invention relates to a displaying apparatus. More particularly, the present invention relates to a 2D/3D image displaying apparatus.

Description of Related Art

For a conventional display for displaying three-dimensional (3D) images, it usually produces binocular disparity by temporally or spatially multiplexing left and right views. However, temporally multiplexing views easily causes images to flicker, and spatially multiplexing views easily causes resolution of images to deteriorate.

On the other hand, for a conventional display for displaying two-dimensional (2D) images, in order to solve problems about viewing angles, a liquid crystal display with multi-domain vertical alignment (MVA) technique is developed. In the MVA liquid crystal display, a liquid crystal area is divided into multiple areas so that liquid crystal molecules incline to multiple directions to increase viewing angles of the liquid crystal display. Moreover, in order to further solve problems about color wash-out in the MVA liquid crystal display, prior arts also provide several solutions.

However, for the present art, the liquid crystal displays are mostly provided for processing only 3D or 2D images so as to solve respective problems. Thus, it is necessary to provide a displaying apparatus capable of selectively displaying 2D or 3D images and solving the foregoing problems of displaying 2D and 3D images in the meantime.

SUMMARY

In accordance with one embodiment of the present invention, a two-dimensional/three-dimensional (2D/3D) image displaying apparatus is provided. The 2D/3D image displaying apparatus comprises a sub-pixel, a first data line, a second data line and a gamma circuit. The sub-pixel comprises a first portion and a second portion. The first data line and the second data line are separately coupled to the first portion and the second portion of the sub-pixel. The gamma circuit is configured for transmitting different gamma signals having dependent relationships therebetween to a driving circuit when a 2D image is displayed, to drive the first portion and the second portion of the sub-pixel through the first data line and the second data line by the driving circuit, and transmitting a single gamma signal to the driving circuit when a 3D image is displayed, to drive the first portion and the second portion of the sub-pixel through the first data line and the second data line by the driving circuit.

In accordance with another embodiment of the present invention, a two-dimensional/three-dimensional (2D/3D) image displaying apparatus is provided. The 2D/3D image displaying apparatus comprises a pixel array, a plurality of data lines, a driving circuit, a gamma circuit and a timing controller. The pixel array comprises a plurality of pixels, each of the pixels comprises a plurality of sub-pixels, and each of the sub-pixels further comprises a first portion and a second portion. Two of the data lines are separately coupled to the first portions and the second portions of a number of the sub-pixels. The driving circuit is coupled to the data lines. The gamma circuit is configured for transmitting gamma signals to the driving circuit when a 2D image is displayed, to separately and dependently drive the first portions and the second portions of the sub-pixels, and transmitting gamma signals to the driving circuit when a 3D image is displayed, to separately and independently drive the first portions and the second portions of the sub-pixels. The timing controller is configured for transmitting timing control signals with different frequencies to the driving circuit respectively when the 2D and 3D image are displayed, to control the driving circuit.

In accordance with yet another embodiment of the present invention, a two-dimensional/three-dimensional (2D/3D) image displaying apparatus is provided. The 2D/3D image displaying apparatus comprises a sub-pixel, a data driving circuit and a gamma circuit. The sub-pixel comprises a plurality of portions, and the portions of the sub-pixel are formed by intersecting a plurality of data lines and a plurality of scan lines. The data driving circuit is coupled to the data lines and configured for transmitting image signals to the data lines to drive the portions of the sub-pixel. The gamma circuit is configured for transmitting different gamma signals having dependent relationships therebetween to the data driving circuit to drive the portions of the sub-pixel through the data lines to display a 2D image, or for transmitting a single gamma signal to the data driving circuit to drive the portions of the sub-pixel through the data lines to display a 3D image.

In accordance with still another embodiment of the present invention, a two-dimensional/three-dimensional (2D/3D) image displaying apparatus is provided. The 2D/3D image displaying apparatus comprises a display panel, a driving circuit and a timing controller. The driving circuit is coupled to the display panel. The timing controller is configured for transmitting timing control signals with different frequencies to the driving circuit respectively when the 2D and 3D image is displayed, to control the driving circuit, wherein the frequency of the timing control signal transmitted by the timing controller when the 2D image is displayed is larger than the frequency of the timing control signal transmitted when the 3D image is displayed.

It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiments, with reference to the accompanying drawings as follows.

DESCRIPTION OF THE PREFERRED EMBODIMENTS

In the following detailed description, the embodiments of the present invention have been shown and described. As will be realized, the invention is capable of modification in various respects, all without departing from the invention. Accordingly, the drawings and description are to be regarded as illustrative in nature, and not restrictive.

Figure 1:
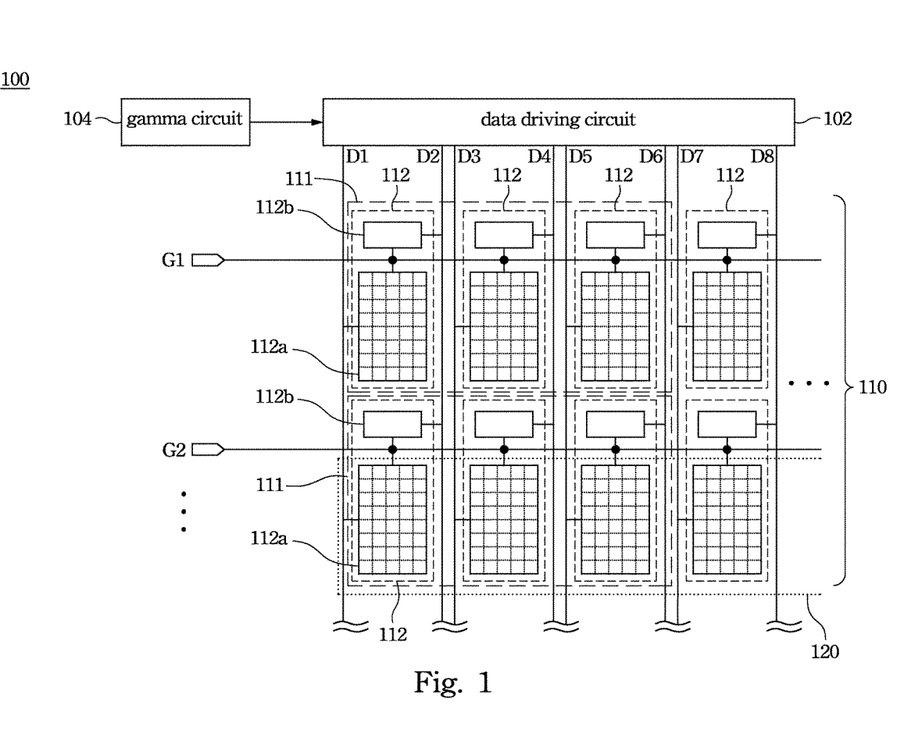
FIG. 1 illustrates a two-dimensional/three-dimensional (2D/3D) image displaying apparatus according to one embodiment of the present invention.

FIG. 1 illustrates a two-dimensional/three-dimensional (2D/3D) image displaying apparatus according to an embodiment of the present invention. The 2D/3D image displaying apparatus 100 includes a plurality of data lines (e.g. D1, D2, . . . ), a plurality of scan lines (e.g. G1, G2, . . . ), a data driving circuit 102, a gamma circuit 104 and a pixel array 110, in which the pixel array 110 is defined by intersecting the data lines D1, D2, . . . and the scan lines G1, G2, . . . , and the gamma circuit 104 is configured for transmitting gamma signals to the data driving circuit 102, so as to drive the pixel array 110 through the data lines D1, D2, . . . by the data driving circuit 102, such that the pixel array 110 displays images according to data transmitted through the data lines D1, D2, . . . .

In the present embodiment, the pixel array 110 includes a plurality of pixels 111, and each of the pixels 111 includes a plurality of sub-pixels 112 which can be red, green or blue. In addition, each sub-pixel 112 includes a first portion 112a and a second portion 112b, and the first portion 112a and second portion 112b of the sub-pixel 112 are separately coupled to the corresponding data lines and coupled to the corresponding scan line together. Specifically, in FIG. 1, the first portion 112a and second portion 112b of the sub-pixel 112 at the 1$^{st}$ column and 1$^{st}$ row are separately coupled to the corresponding data lines D1 and D2 and also coupled to the corresponding scan line G1 together. For the sub-pixel 112 on the same row and adjacent to the sub-pixel 112 at the 1$^{st}$ column and 1$^{st}$ row, its first portion 112a and second portion 112b are separately coupled to the corresponding data lines D3 and D4 and also coupled to the corresponding scan line G1 together. For the sub-pixel 112 on the same column and adjacent to the sub-pixel 112 at the 1$^{st}$ column and 1$^{st}$ row, its first portion 112a and second portion 112b are separately coupled to the corresponding data lines D1 and D2 and coupled to the corresponding scan line G2 together. The rest of sub-pixels 112 may be deduced by analogy. Therefore, it can be seen that each sub-pixel 112 is coupled to two data lines and one scan line. Moreover, in one embodiment, a ratio of the size of the first portion 112a to the size of the second portion 112b is approximately 1:1. However, persons skilled in the art can adjust the ratio in practice.

When the 2D/3D image displaying apparatus 100 displays 2D images, the gamma circuit 104 transmits gamma signals to the data driving circuit 102 such that the data driving circuit 102 separately and dependently drives the first portion 112a and the second portion 112b of each sub-pixel 112 through the data lines D1, D2, . . . . Specifically, when 2D images are displayed, the gamma circuit 104 transmits different gamma signals having dependent relationships therebetween to the data driving circuit 102, such that the first portion 112a and the second portion 112b of each sub-pixel 112 are driven by the data driving circuit 102, resulting in that the corresponding first portion 112a and second portion 112b display images with different illumination. For example, when the sub-pixel 112 is about to display the image having a certain gray level, the gamma circuit 104 would transmit different but matching gamma signals to the data driving circuit 102, such that gray-level images displayed by the first portion 112a and the second portion 112b are just matched to be the gray-level images which the sub-pixel 112 is about to display, even if the first portion 112a and the second portion 112b display different gray-level images.

On the other hand, when the 2D/3D image displaying apparatus 100 displays 3D images, the gamma circuit 104 transmits gamma signals to the data driving circuit 102 such that the data driving circuit 102 separately and independently drives the first portion 112a and the second portion 112b of each sub-pixel 112 through the data lines D1, D2, . . . . Specifically, when 3D images are displayed, the gamma circuit 104 transmits a single gamma signal to the data driving circuit 102, such that the first portion 112a and the second portion 112b of each sub-pixel 112 are driven by the data driving circuit 102, resulting in that the corresponding first portion 112a and second portion 112b display different and independent gray-level images.

The 2D/3D image displaying apparatus 100 further includes a patterned optical phase retarder 120 which is selectively arranged corresponding to the first portions 112a or the second portions 112b of the sub-pixels 112, so as to modulate the light passing through the first portions 112a or the second portions 112b. In the present embodiment, the patterned optical phase retarder 120 is exemplarily arranged corresponding to the first portions 112a of each row of the sub-pixels 112, as shown in FIG. 1, so as to modulate the light passing through the first portions 112a, such that the first portions 112a can produce different polarization from that of the second portions 112b and display desired images.

Figure 2:
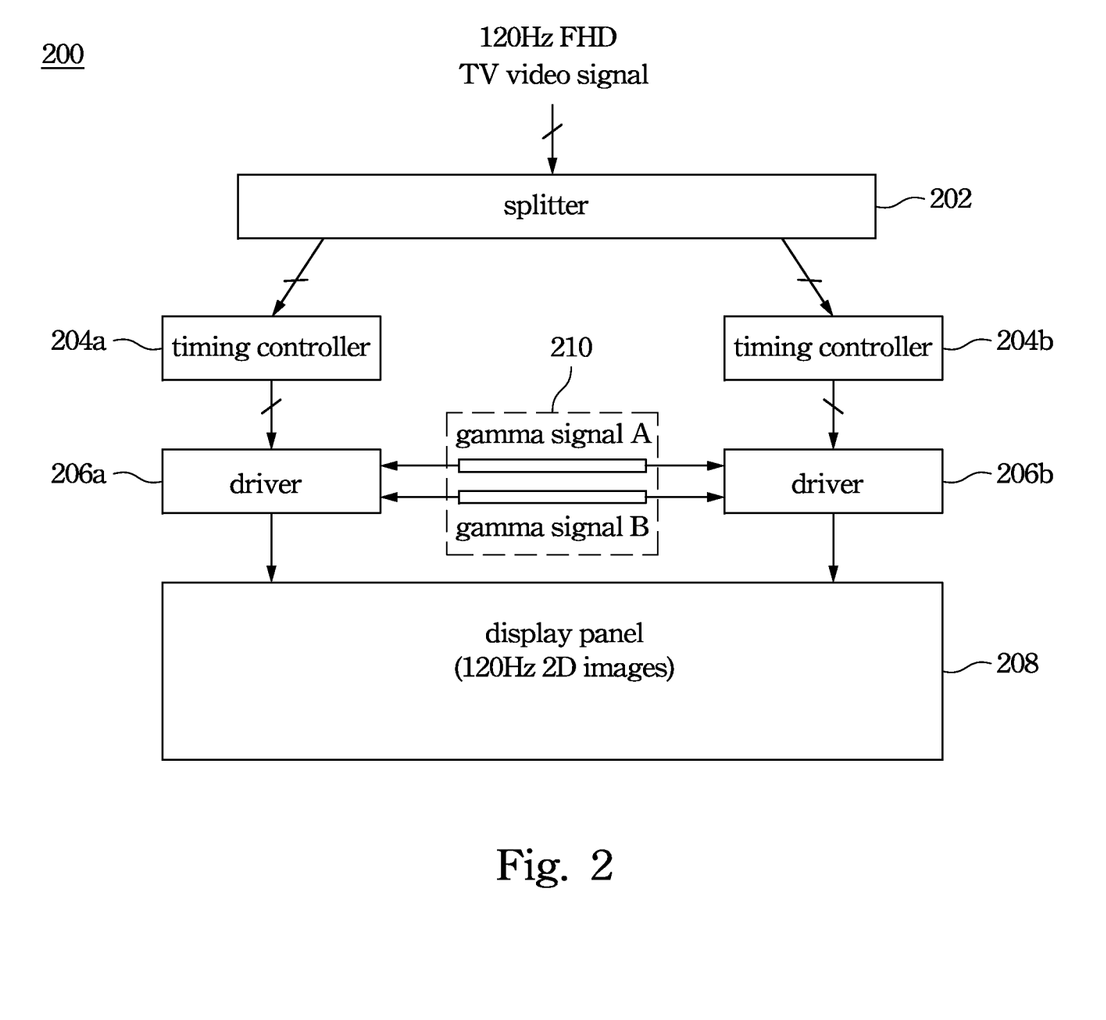
FIG. 2 illustrates a block diagram of the 2D/3D image displaying apparatus according to one embodiment of the present invention.

FIG. 2 illustrates a block diagram of the 2D/3D image displaying apparatus according to one embodiment of the present invention. The 2D/3D image displaying apparatus 200 includes a splitter 202, timing controllers 204a and 204b, drivers 206a and 206b, a display panel 208 and a gamma circuit 210, in which the display panel 208 can include the data lines, scan lines and pixel array as shown in FIG. 1, and the timing controllers 204a and 204b or the drivers 206a and 206b can be integrated into a single circuit for processing signals. After receiving and distributing a TV video signal with full high definition (FHD) and a frequency of 120 Hz, the splitter 202 transmits the processed signals to the timing controllers 204a and 204b respectively. Then, the drivers 206a and 206b are controlled respectively by the timing controllers 204a and 204b and separately transmit data to the display panel 208 according to the processed signals received from the timing controllers 204a and 204b and different gamma signals (or gamma voltages) A and B transmitted from the gamma circuit 210, respectively, such that the display panel 208 is capable of displaying 2D images with a frequency of 120 Hz without causing color wash-out problems.

Figure 3:
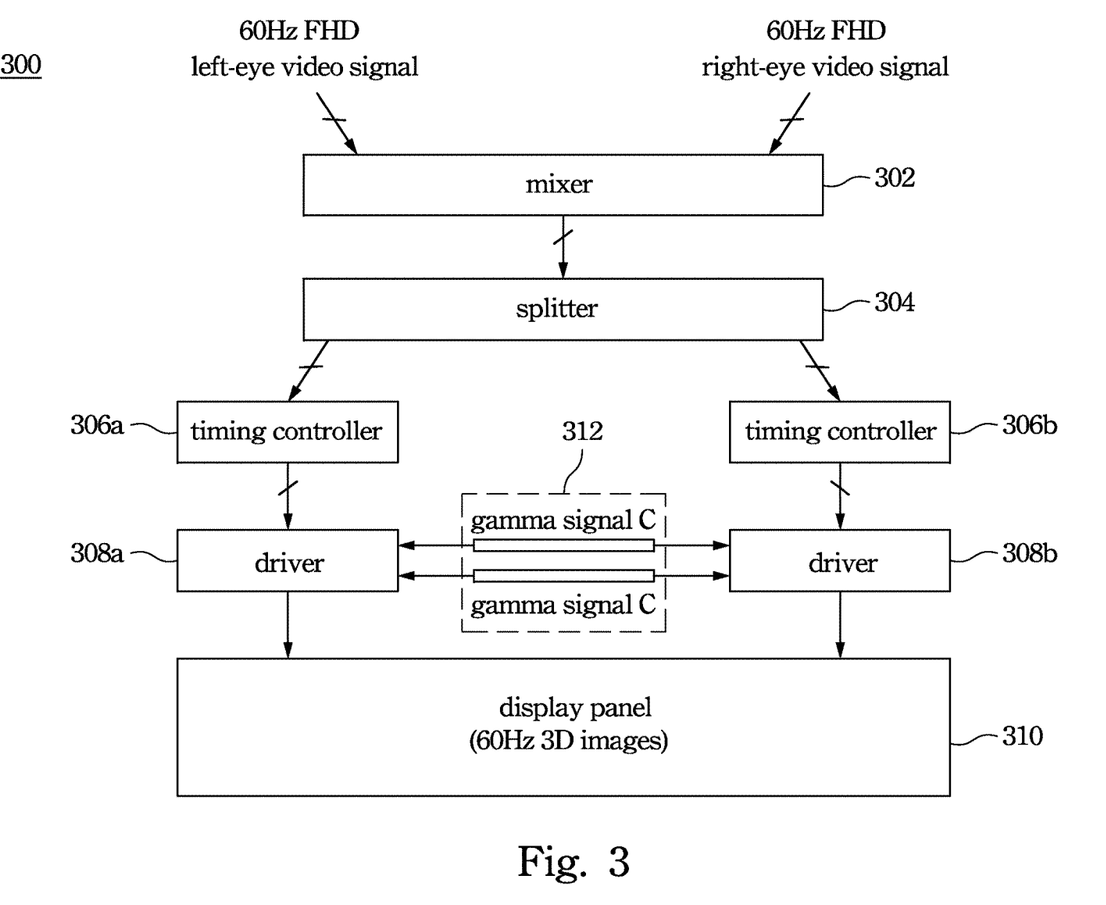
FIG. 3 illustrates a block diagram of the 2D/3D image displaying apparatus according to another embodiment of the present invention.

FIG. 3 illustrates a block diagram of the 2D/3D image displaying apparatus according to another embodiment of the present invention. The 2D/3D image displaying apparatus 300 includes a mixer 302, a splitter 304, timing controllers 306a and 306b, drivers 308a and 308b, a display panel 310 and a gamma circuit 312, in which the display panel 310 can include the data lines, scan lines and pixel array as shown in FIG. 1, the timing controllers 306a and 306b or the drivers 308a and 308b can be integrated into a single circuit for processing signals, and the gamma circuit 312 can be the same as the gamma circuit 210 as shown in FIG. 2. After receiving and superimposing a left-eye and right-eye video signal with full high definition (FHD) and a frequency of 60 Hz, the mixer 302 transmits the processed signals to the splitter 304. Then, after receiving and distributing the signal from the mixer 302, the splitter 304 transmits the processed signals to the timing controllers 306a and 306b respectively. After that, the drivers 308a and 308b are controlled respectively by the timing controllers 306a and 306b and transmit data to the display panel 310 according to the processed signals received from the timing controllers 306a and 306b and single gamma signal C transmitted from the gamma circuit 312, such that the first portions and second portions of the sub-pixels in the display panel 310 are capable of respectively displaying left-eye and right-eye 3D images with frequency of 60 Hz, for users wearing polarized glasses to view the 3D images displayed on the display panel 310, without causing resolution of 3D images to deteriorate.

Figure 3A:
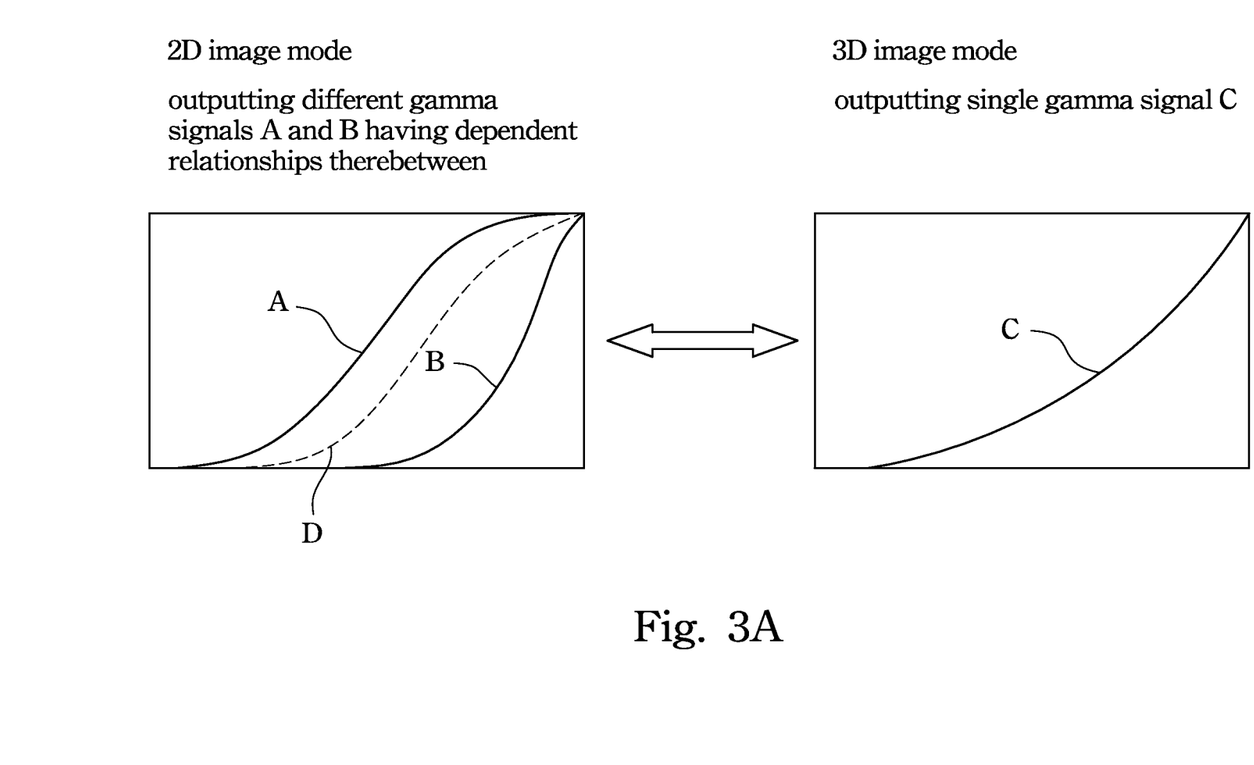
FIG. 3A illustrates the switch of gamma signals outputted by the gamma circuit operating under 2D/3D image mode according to one embodiment of the present invention.

FIG. 3A illustrates the switch of gamma signals outputted by the gamma circuit operating under 2D and 3D image modes according to one embodiment of the present invention. As shown in FIG. 3A, when the gamma circuit operates under the 2D image mode, the gamma circuit outputs different gamma signals A and B having dependent relationships therebetween, such that the driving circuit can separately drive the first portions 112a and the second portions 112b of the sub-pixels 112 according to the different gamma signals A and B, and the first portions 112a and the second portions 112b of the sub-pixels 112 display the images corresponding to the gamma signals A and B having dependent relationships therebetween, to solve color wash-out problems. The gamma signal D represented by the dotted line is equivalent to the ultimately outputted gamma signal (corresponding to the gray-level image on the display screen and viewed by human eyes) after the gamma signals A and B are superimposed. On the contrary, when the gamma circuit operates under the 3D image mode, the gamma circuit outputs single gamma signal C, such that the driving circuit can separately drive the first portions 112a and the second portions 112b of the sub-pixels 112 according to the gamma signal C, and the first portions 112a and the second portions 112b of the sub-pixels 112 separately display different and independent images according to the gamma signal C, to prevent from deteriorating resolution of 3D images.

In other words, when the display device operates under 2D and 3D image mode respectively, the switch between 2D and 3D image modes can be performed by using a programmable gamma circuit or gamma IC to transmit required gamma signals corresponding to 2D or 3D images to the driving circuit, for the display device to display 2D or 3D images.

On the other hand, for the timing controllers shown in FIGS. 2 and 3, they transmit timing control signals with different frequencies to the driving circuit when 2D and 3D images are displayed respectively, so as to control the driving circuit. In one embodiment, the frequency of the timing control signal transmitted by the timing controller when the 2D image is displayed is larger than the frequency of the timing control signal transmitted when the 3D image is displayed. Taking the embodiments in FIGS. 2 and 3 for example, the timing control signal transmitted by the timing controller when the 2D image is displayed is two times the frequency of the timing control signal transmitted when the 3D image is displayed. As a result, the displaying apparatus can separately display 2D images with frequency of 120 Hz or 3D images with frequency of 60 Hz by being switched to operate with different frequencies.

Moreover, in another embodiment, the foregoing splitter 304 further can transmit the processed signals to the timing controllers 306a and 306b respectively for follow-up process after distributing one multi-view image signal, such that the first portions and the second portions of the sub-pixels in the display panel 310 separately display the corresponding portions of the multi-view image, for viewers with naked eyes to view the displayed 3D images on the display panel 310. Therefore, the foregoing embodiments in FIGS. 2 and 3 are employed with different data streaming manners to respectively transmit different frame data to different regions of each sub-pixel, to further achieve the effect of enhancing resolution of images.

Thus, when the 2D/3D image displaying apparatus in the embodiment of the present invention has the display panel shown in FIG. 1, the 2D/3D image displaying apparatus can include the circuits shown in FIGS. 2 and 3 and can switch when displaying 2D or 3D image, so as to process the 2D or 3D image data.

Figure 4:
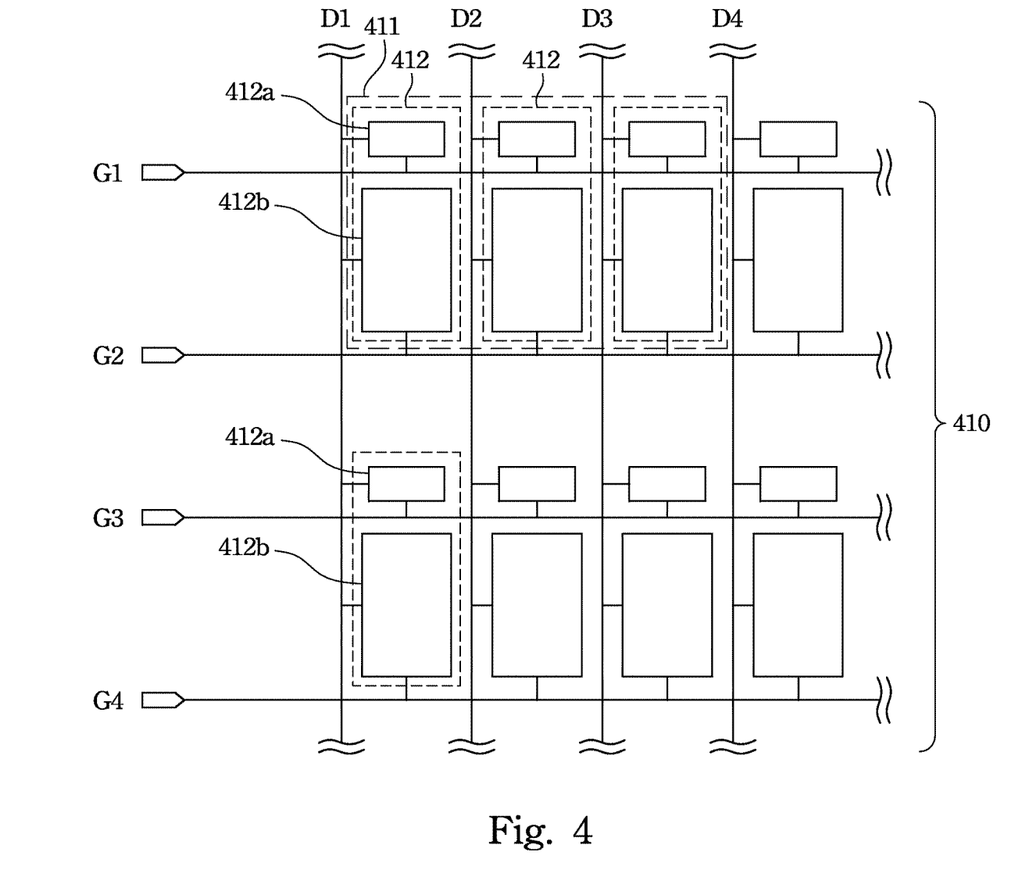
FIG. 4 illustrates a pixel array according to another embodiment of the present invention.

FIG. 4 illustrates a pixel array according to another embodiment of the present invention. Compared to FIG. 1, the pixel array 410 includes a plurality of pixels 411, each of which further includes a plurality of sub-pixels 412, and each sub-pixel 412 includes a first portion 412a and a second portion 412b, in which a ratio of the size of the first portion 412a to the size of the second portion 412b can be approximately 1:1, in which persons skilled in the art can adjust the ratio in practice, and the first portion 412a and the second portion 412b can be separately coupled to the corresponding scan lines and coupled to the corresponding data line together.

Specifically, in FIG. 4, the first portion 412a and the second portion 412b of the sub-pixel 412 at the $1^{st}$ column and $1^{st}$ row are separately coupled to the corresponding scan lines G1 and G2 and coupled to the corresponding data line D1 together. For the sub-pixel 412 on the same column and adjacent to the sub-pixel 412 at the $1^{st}$ column and $1^{st}$ row, its first portion 412a and second portion 412b are separately coupled to the corresponding scan lines G3 and G4 and also coupled to the corresponding data line D1 together. For the sub-pixel 412 on the same row and adjacent to the sub-pixel 412 at the $1^{st}$ column and $1^{st}$ row, its first portion 412a and second portion 412b are separately coupled to the corresponding scan lines G1 and G2 and coupled to the corresponding data line D2 together. The rest of sub-pixels 412 may be deduced by analogy. Therefore, it can be seen that each sub-pixel 412 is coupled to two scan lines and one data line.

As a result, the first portions 412a and the second portions 412b in the pixel array 410 also can be analogous to the first portions 112a and the second portions 112b in FIG. 1 and display corresponding 2D or 3D images according to the driving circuit and its operations. Similarly, the 2D/3D image displaying apparatus 400 can further include a patterned optical phase retarder (not shown) which is selectively arranged corresponding to the first portions 412a or the second portions 412b of the sub-pixels 412, so as to modulate the light passing through the first portions 412a or the second portions 412b.

Figure 5:
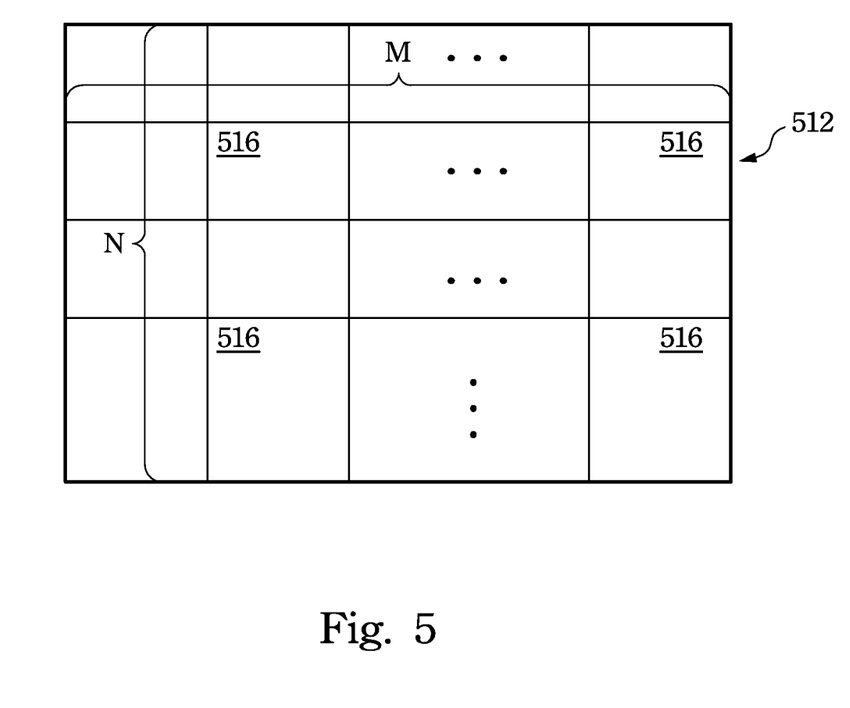
FIG. 5 illustrates a single sub-pixel according to yet another embodiment of the present invention. The sub-pixel 512 can be red, green or blue.

Based on the concepts in FIGS. 1 and 4, a single sub-pixel further can be designed to include a plurality of portions. FIG. 5 illustrates a single sub-pixel according to yet another embodiment of the present invention. The sub-pixel 512 can be red, green or blue. Compared to the sub-pixel in FIGS. 1 and 4, the sub-pixel 512 in the present embodiment includes a plurality of portions 516 which are defined by intersecting a plurality of (e.g. M) data lines and a plurality of (e.g. N) scan lines; that is, each sub-pixel 512 is coupled to M data lines and N scan lines and has a plurality of portions 516, and the sizes of the portions 516 can all be approximately the same.

Notably, although the multiple portions of the sub-pixel shown in FIGS. 1, 4 and 5 are exemplarily illustrated as quadrangles, they can be designed as triangles or other shapes in practice by persons skilled in the art and not limited to the shapes illustrated in FIGS. 1, 4 and 5.

For the foregoing embodiments of the present invention, the 2D/3D image displaying apparatus can be employed to not only improve the color wash-out when the displaying apparatus displays 2D images but also enhance resolution of 3D images displayed on the displaying apparatus when the displaying apparatus displays 3D images.

As is understood by a person skilled in the art, the foregoing embodiments of the present invention are illustrative of the present invention rather than limiting of the present invention. It is intended to cover various modifications and similar arrangements included within the spirit and scope of the appended claims, the scope of which should be accorded the broadest interpretation so as to encompass all such modifications and similar structures.

What is claimed is:

1. A two-dimensional/three-dimensional (2D/3D) image displaying apparatus, comprising:
   a pixel comprising sub-pixels, wherein each of the sub-pixels comprises a first portion and a second portion both for displaying images with the same color;
   a first data line and a second data line separately coupled to the first portion and the second portion of one of the sub-pixels;
   a scan line coupled to the first portion and the second portion of one of the sub-pixels; and
   a gamma circuit for transmitting a first gamma signal according to a first gamma curve to a driving circuit to drive the first portion of the sub-pixel and a second gamma signal according to a second gamma curve to the driving circuit to drive the second portion of the sub-pixel when a 2D image is to be displayed, and for transmitting a gamma signal according to one of the first and the second gamma curve to the driving circuit to drive the first portion and the second portion of the sub-pixel when a 3D image is to be displayed.

2. The 2D/3D image displaying apparatus as claimed in claim 1, further comprising:
   a patterned optical phase retarder arranged corresponding to the first portion of the sub-pixel.

3. The 2D/3D image displaying apparatus as claimed in claim 1, wherein a ratio of size of the first portion to size of the second portion is approximately 1:1.

4. The 2D/3D image displaying apparatus as claimed in claim 1, wherein the pixel comprises a red sub-pixel, a green sub-pixel, and a blue sub-pixel, wherein the red sub-pixel comprises a first portion and a second portion, the green sub-pixel comprises a third portion and a fourth portion, and the blue sub-pixel comprises a fifth portion and a sixth portion; wherein the 2D/3D image displaying apparatus further comprises a third to six data lines, wherein the first data line is coupled to the first portion, the second data line is coupled to the second portion, the third data line is coupled to the third portion, the fourth data line is coupled to the fourth portion, the fifth data line is coupled to the fifth portion, and the sixth data line is coupled to the sixth portion; wherein the scan line is coupled to the first portion to the sixth portion.

5. A two-dimensional/three-dimensional (2D/3D) image displaying apparatus, comprising:
   a pixel array comprising a plurality of pixels, each of the plurality of pixels comprising a plurality of sub-pixels, and each of the sub-pixels comprising a first portion and a second portion both for displaying images with the same color;
   a plurality of data lines, two of the data lines separately coupled to the first portions and the second portions of a number of the sub-pixels;
   a driving circuit coupled to the data lines;
   a gamma circuit for transmitting a first gamma signal according to a first gamma curve and a second gamma signal according to a second gamma curve to the driving circuit to separately and dependently drive the first portions and the second portions of the sub-pixels when a 2D image is to be displayed and for transmitting the gamma signals according to one of the first and second gamma curve to the driving circuit to separately and independently drive the first portions and the second portions of the sub-pixels when a 3D image is to be displayed; and
   a timing controller for transmitting timing control signals with different frequencies to the driving circuit to control the driving circuit, respectively, when the 2D and 3D images are respectively to be displayed.

6. The 2D/3D image displaying apparatus as claimed in claim 5, wherein when the 2D image is displayed, the gamma circuit transmits different gamma signals having dependent relationships therebetween to the driving circuit to drive at least two of the data lines.

7. The 2D/3D image displaying apparatus as claimed in claim 5, wherein when the 3D image is displayed, the gamma circuit transmits a single gamma signal to the driving circuit to drive at least two of the data lines.

8. The 2D/3D image displaying apparatus as claimed in claim 5, further comprising:
   a patterned optical phase retarder arranged corresponding to the first portions of the sub-pixels.

9. The 2D/3D image displaying apparatus as claimed in claim 5, wherein a ratio of size of the first portion to size of the second portion is approximately 1:1.

10. The 2D/3D image displaying apparatus as claimed in claim 5, wherein the frequency of the timing control signal transmitted by the timing controller when the 2D image is displayed is larger than the frequency of the timing control signal transmitted when the 3D image is displayed.

11. A two-dimensional/three-dimensional (2D/3D) image displaying apparatus, comprising:
   a pixel comprising, a sub-pixel, wherein the sub-pixel comprises a plurality of portions, and the portions of the sub-pixel are defined by intersecting a plurality of data lines and a plurality of scan lines;
   a data driving circuit coupled to the data lines and configured for transmitting image signals to the data lines to drive the portions of the sub-pixel; and
   a gamma circuit for transmitting a first gamma signal according to a first gamma curve and a second gamma signal according to a second gamma curve to the data driving circuit to separately and dependently drive the first portions and the second portions of the sub-pixels when a 2D image is to be displayed and for transmitting the gamma signals according to one of the first and second gamma curve to the data driving circuit to separately and independently drive the first portions and the second portions of the sub-pixels when a 3D image is to be displayed.

12. The 2D/3D image displaying apparatus as claimed in claim 11, further comprising:
a scan driving circuit coupled to the scan lines and configured for transmitting driving signals to the scan lines to drive the portions of the sub-pixel.

13. The 2D/3D image displaying apparatus as claimed in claim 11, wherein sizes of the portions of the sub-pixel are approximately the same.

14. The 2D/3D image displaying apparatus as claimed in claim 11, further comprising:
a patterned optical phase retarder arranged corresponding to a number of the portions of the sub-pixel.

15. The 2D/3D image displaying apparatus as claimed in claim 11, further comprising:
a timing controller for transmitting timing control signals with different frequencies to the data driving circuit to control the data driving circuit, respectively, when the 2D and 3D images are respectively to be displayed, wherein the timing control signal transmitted by the timing controller when the 2D image is displayed is two times the frequency of the timing control signal transmitted when the 3D image is displayed.

16. A two-dimensional/three-dimensional (2D/3D) image displaying apparatus, comprising:
a display panel comprising a pixel as claimed in claim 1;
a driving circuit coupled to the display panel; and
a timing controller for transmitting timing control signals with different frequencies to the driving circuit to control the driving circuit, respectively, when the 2D and 3D images are respectively to be displayed by the display panel, wherein the frequency of the timing control signal transmitted by the timing controller when the 2D image is displayed is larger than the frequency of the timing control signal transmitted when the 3D image is displayed.

17. The 2D/3D image displaying apparatus as claimed in claim 16, wherein the timing control signal transmitted by the timing controller when the 2D image is displayed is two times the frequency of the timing control signal transmitted when the 3D image is displayed.

18. The 2D/3D image displaying apparatus as claimed in claim 1, wherein the first gamma signal and the second gamma signal are matching to each other such that gray-level images displayed by the first portion and the second portion are just matched to be the gray-level images which the sub-pixel is about to display.

19. The 2D/3D image displaying apparatus as claimed in claim 11, wherein the dependent relationships are that the different gamma signals are matching to each other such that gray-level images displayed by the first portion and the second portion are just matched to be the gray-level images which the sub-pixel is about to display.

20. The 2D/3D image displaying apparatus as claimed in claim 1, wherein the gamma circuit transmits different gamma signals having dependent relationships therebetween to the driving circuit such that the first portion of the sub-pixel and second portion of the sub-pixel display images with different illumination, and the gray-level images displayed by the first portion and the second portion are just matched to be the gray-level images which the sub-pixel is about to display.

* * * * *